UNITED STATES PATENT OFFICE.

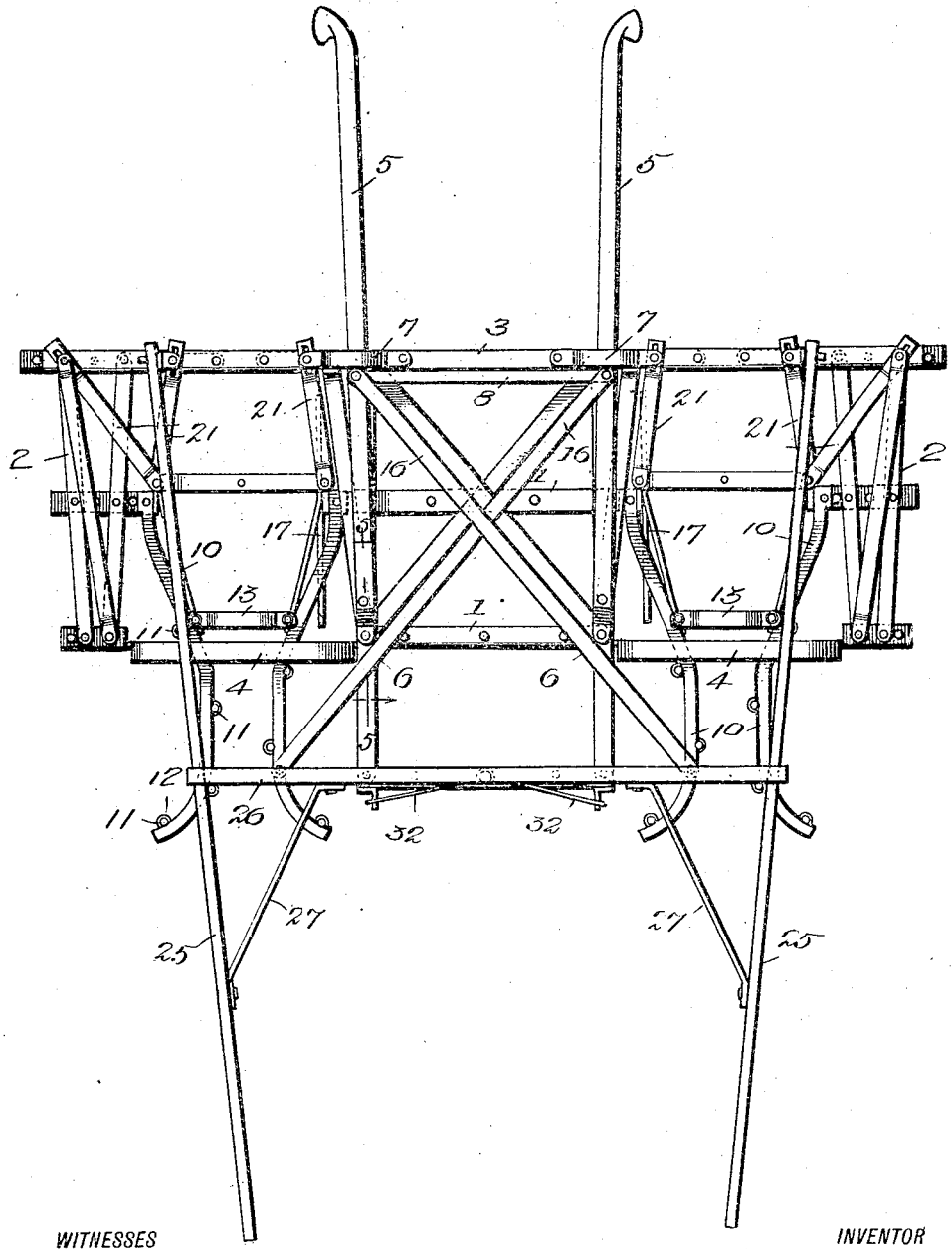

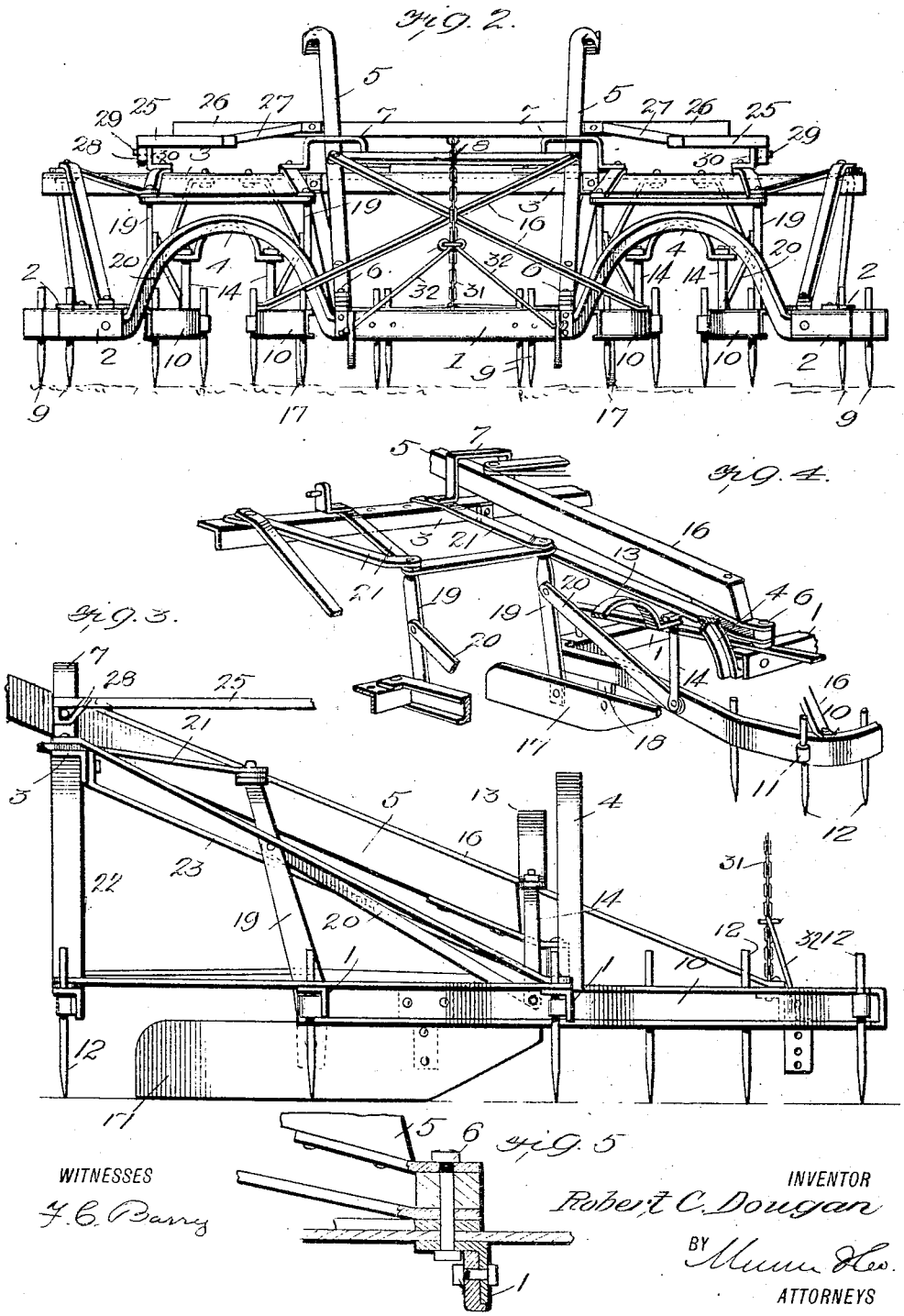

ROBERT C. DOUGAN, OF MILLERSBURG, OHIO.

CULTIVATOR.

1,284,617.  Specification of Letters Patent.  Patented Nov. 12, 1918.

Application filed August 2, 1916. Serial No. 112,655.

*To all whom it may concern:*

Be it known that I, ROBERT C. DOUGAN, a citizen of the United States, and a resident of Millersburg, in the county of Holmes and State of Ohio, have invented an Improvement in Cultivators, of which the following is a specification.

My invention is an improvement in cultivators, and has for its object to provide a device of the character specified, especially adapted for cultivating corn, wherein means is provided for harrowing the ground upon each side of the row to break up the crust and form a mulch, without disturbing the seed or the growing plants, and adapted to be used until the corn is laid by.

In the drawings:

Figure 1 is a top plan view of the improved cultivator.

Fig. 2 is a front view.

Fig. 3 is a partial side view.

Fig. 4 is a partial perspective view.

Fig. 5 is a section on the line 5—5 of Fig. 1, looking in the direction of the arrows adjacent to the line.

The present embodiment of the invention comprises a sectional frame, consisting of a central section 1 and lateral sections 2, spaced apart from the central section, and the said sections are connected at the rear by a transverse bar 3 elevated above the rear ends of the sections, and at their front ends by an arch 4, an arch being arranged between each lateral and the central frame.

Handles 5 are connected with the frame, each handle being pivoted at its front end to the front end of the central frame, as indicated at 6, and intermediate its end each handle passes beneath a guide loop 7 on the transverse bar 3. The handles are connected by a cross brace 8, and the loops 7 are of a length to permit the handles to swing laterally, while the brace 8 holds them in proper relative position with respect to each other.

Draft apparatus to be described, is connected with the front of the central section of the frame and the said central section is extended beyond the lateral sections, as shown. Both the central frame and the lateral frames have cultivating teeth 9, and other teeth are supported by beams 10 which are mounted in pairs between each lateral frame and the central frame. Each of the lateral frames consists of front, rear and intermediate cross bars, which are connected by brace plates, as shown, and the central frame is similarly constructed, having, however, four cross bars instead of three.

The beams 10 are pivoted at their rear to the inner ends of the intermediate cross bars of the lateral frames and to the corresponding cross bars of the central frames. Each of the beams 10 is provided with laterally extending bearing sockets 11 in which are held cultivating teeth 12, and the beams are connected by arch members 13 intermediate their ends, to properly space them apart during their swinging movement. These arch bars are spaced above the beam by rods 14, each rod being connected at its lower end to the beam and at its upper end to the arch bar.

A link 16 connects the front end of each beam 13 with the opposite handle 5 near the loop 7, and since the plows of each pair are connected together it will be evident that when the handles are swung in either direction, the front ends of the beams will swing in the same direction. The inner beam of each pair is provided with a shoe or runner 17, each runner being a plate having its forward lower corner beveled, and each runner is connected, near its front end, to a depending lug 18 from the beam, and near its rear end to the lower end of a standard 19, which is also connected to the beam at its rear end and extends upwardly above the same. These standards are braced against the beam by inclined braces 20, and they are connected to the cross bar 3 by braces 21. The cross bar 3 is connected to the rear ends of the frame sections by struts 22, and to the front ends of the said sections by inclined braces 23.

As is known, corn rows do not extend straight, and the improved cultivator is designed to follow the rows, cultivating two rows at a time. The members of each pair of beams are closer together near their front ends than at their rear, the said members being relatively near in front of the arch bar 13 and diverging toward their connection with the frame sections.

By means of the handles 5, the operator may cause the teeth 12 connected with the beams 10 to follow closely the row, yet without disturbing the plants or the seed. When the handles 5 are swung in either direction, the front ends of the pairs of beams will be swung in the same direction, thus permitting the operator to cultivate the row on both sides and close to the plants. The runner by its engagement with the ground guides the cultivator, and the runners are turned when the front ends of the beams are thrown in either direction.

Shafts 25 are provided for drawing the improved cultivator, and the shafts are connected by a cross bar 26 intermediate their ends, and at such a point that when the shafts are in place, the cross bar will be above the front end of the central section and the cross bars braced against the shafts by inclined braces 27. Each of these shafts is provided at its rear end with a loop 28, which is adapted to engage an outwardly extending pin 29, on an angle bracket 30 secured to the frame. When these loops are engaged over the pin, the shafts are in place, and a chain 31 connects the cross bar with the front end of the central frame section, the chain being braced by draft links 32 at each side, and the links 32 are connected with the sides of the central section of the frame at the front end thereof.

I claim:

A cultivator comprising a main frame having a passage for the plants at each side, a pair of beams carrying cultivating mechanism at each passage, said beams being pivoted to the frame at the opposite sides of the passage at the front ends of the beams, a connection between the beams at each passage to cause them to swing together, a guide shoe connected with one of each pair and movable therewith for guiding the frame, said frame consisting of a central and lateral section, the passages for the plants being formed by spacing the lateral sections from the central section, handles pivoted to the frame at the front ends of the handles, and a connection between each handle and a beam of the pair at the opposite end of the frame for moving the said beam.

ROBERT C. DOUGAN.

Witnesses:
JOHN HUSTON,
J. A. MAST.

Copies of this patent may be obtained for five cents each, by addressing the "Commissioner of Patents, Washington, D. C."